United States Patent [19]

Vasselet

[11] Patent Number: 5,051,063

[45] Date of Patent: Sep. 24, 1991

[54] LEAKAGE-TYPE PRESSURE REGULATOR FOR A HYDRAULIC CIRCUIT

[75] Inventor: Joël Vasselet, Chelles, France

[73] Assignee: Bendix Europe Services Techniques, Drancy, France

[21] Appl. No.: 528,648

[22] Filed: May 24, 1990

[30] Foreign Application Priority Data

Jun. 14, 1989 [FR] France ............... 89 07859

[51] Int. Cl.[5] ............................. F04B 49/02
[52] U.S. Cl. ...................... 417/44; 303/59; 303/84.1
[58] Field of Search ............ 417/44; 92/162 P; 303/84.1, 59, 60, 10, 11

[56] References Cited

U.S. PATENT DOCUMENTS

| 4,094,554 | 6/1978 | Leiber | 303/10 |
| 4,476,889 | 10/1984 | Haynes | 417/44 |
| 4,662,605 | 5/1987 | Garcia | 251/129 |
| 4,744,389 | 5/1988 | Ichihashi | 137/625.6 |
| 4,938,541 | 7/1990 | Shaw et al. | 303/10 |

FOREIGN PATENT DOCUMENTS

| 0317183 | 5/1989 | European Pat. Off. . |
| 3402352 | 7/1985 | Fed. Rep. of Germany . |
| 2577701 | 8/1986 | France . |

Primary Examiner—Leonard E. Smith
Assistant Examiner—David W. Scheuermann
Attorney, Agent, or Firm—Larry J. Palguta; Ken C. Decker

[57] ABSTRACT

The leakage-type pressure regulator for a hydraulic circuit, including at least one reservoir of fluid under low pressure (5), a pump (11) and an accumulator of fluid under high pressure (9), comprises: a pusher (19) projecting from a chamber (3) connected to the reservoir (5); at least one sensor (27) detecting the position of a magnetic core (23) sliding under the effect of the pusher (19) in the vicinity of the sensor (27), so as to control the functioning of the pump (11); a piston (17) sliding non-sealingly in a bore (7) communicating with a chamber (3) on the one hand and with an outlet of the accumulator (9) on the other hand, so as to establish a leakage of the hydraulic fluid between the accumulator (9) and the reservoir (5), the piston (17) having one end bearing on the pusher (19); and an elastic means (21) opposing the effect of the pressure of the fluid in the accumulator (9) on the piston (17), in such a way that the position of the core (23) is a function of the pressure of the fluid in the accumulator (9).

8 Claims, 1 Drawing Sheet

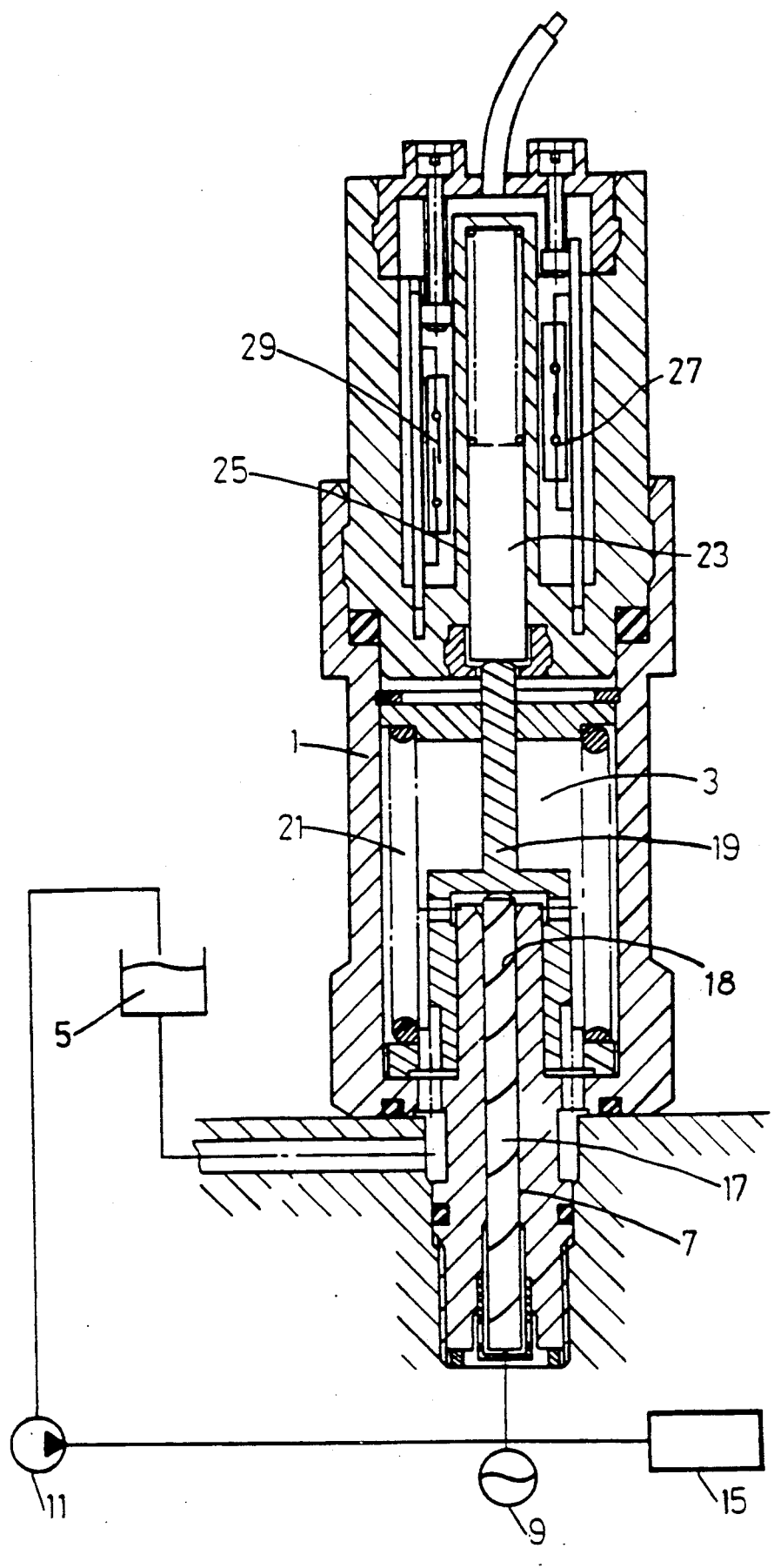

5,051,063

LEAKAGE-TYPE PRESSURE REGULATOR FOR A HYDRAULIC CIRCUIT

BACKGROUND OF THE INVENTION

The present invention relates to hydraulic circuits comprising at least one reservoir of fluid under low pressure, an accumulator of fluid under high pressure and an electrically controlled pump. Such a circuit is found particularly in some brake systems of motor vehicles.

It is known that, during operation, the pressure of the fluid in the accumulator must remain within a specific range, so that the fluid can be suitably used in the hydraulic motor usually connected to the circuit, and that, in the inoperative state, it is desirable for the fluid to escape from the accumulator slowly so as to put the circuit at rest.

It is an object of the invention to provide a pressure regulator making it possible to perform all these functions highly reliably and in a way involving only a little outlay.

SUMMARY OF THE INVENTION

The regulator according to the invention comprises:
a pusher projecting from a chamber connected to the reservoir;
at least one sensor detecting the position of a magnetic core sliding under the effect of the pusher in the vicinity of the sensor, so as to control the functioning of the pump;
a piston sliding non-sealingly in a bore communicating with the chamber on the one hand and with an outlet of the accumulator on the other hand, so as to establish a leakage of the hydraulic fluid between the accumulator and the reservoir, the piston having one end bearing on the pusher; and
an elastic means opposing the effect of the pressure of the fluid in the accumulator on the piston, in such a way that the position of the core is a function of the pressure of the fluid in the accumulator.

Preferably, the elastic means is a helical spring arranged in the chamber and bearing on the pusher.

Likewise preferably, the sensor is a magnetically controlled electrical breaker connected to the electrical supply circuit of the pump.

Finally, preferably, at least one groove, for example helical, is made on the periphery of the piston or in the bore, so as to ensure the self-centering of the piston and its sliding on a fluid film and the desired leakage.

BRIEF DESCRIPTION OF THE DRAWINGS

The invention will now be described by way of example with reference to the accompanying drawing in which the single Figure shows a pressure regulator according to the invention diagrammatically in section.

DETAILED DESCRIPTION OF THE PREFERRED EMBODIMENTS

Referring now to this single Figure, a hydraulic circuit comprises a reservoir of fluid under low pressure 5, connected to an accumulator of fluid under high pressure 9 via an electrical pump 11. A hydraulic motor 15 is likewise connected to the outlet of the accumulator 9.

The regulator according to the invention comprises a body 1, in which is formed a chamber 3 connected to the reservoir 5. A bore 7 communicates with this chamber 3 on the one hand and with the outlet of the accumulator 9 on the other hand. A piston 17 slides non-sealingly in this bore 7 and comes to bear on a pusher 19 arranged in the chamber 3. The assembly consisting of the piston 17 and of the pusher 19 is returned to the rest position by a helical spring 21 arranged in the chamber 3 and bearing on a collar provided for this purpose on the pusher 19.

The latter projects from the chamber 3 and comes to bear on the magnetic core 23, for example made of ferrite, sliding counter to a spring in a bore 25, in the vicinity of which is located a sensor detecting the position of the core, which, in the example illustrated, consists of a magnetically controlled electrical breaker 27 known in the trade by the name of "reed relay". This breaker 27 is open when the magnetic core 23 is substantially opposite the breaker 27 and is otherwise closed. This breaker 27 is arranged in series in the electrical supply circuit of the pump 11, so as to control the activation or deactivation of the latter as a function of the position of the magnetic core 23. In the example illustrated, a second electrical breaker 29 is likewise arranged in the vicinity of the bore 25 in a manner offset relative to the first, so as to detect and signal a low position (in the Figure) of the core 23.

The regulator functions as follows.

When the hydraulic circuit is inoperative, the movable elements of the regulator are in the position illustrated: the piston 17, pusher 19 and core 23 are in the low position (in the Figure).

When the hydraulic circuit is put into operation, the core 23 is in the low position and the breaker 27 is therefore closed. The pump 11 is consequently supplied with electrical power and fills the accumulator 9 with fluid under high pressure taken under low pressure from the reservoir 5. The pressure of the fluid in the accumulator 9 is exerted on the lower end of the piston 17 which is set in motion, thereby moving both the pusher 19, counter to the effect of the spring 21, and the core 23. If the position of equilibrium corresponds to a position of the core 23 substantially opposite the breaker 27, the latter opens and the pump 11 is deactivated.

The pressure in the accumulator 9 then decreases either because of the use of the fluid in the hydraulic motor 15 or because of the leakage of fluid occurring between the piston 17 and the bore 7. The assembly consisting of the piston 17, of the pusher 19 and of the core 23 thus descends correspondingly (in the Figure), moving the core 23 away from the breaker 27. The latter then closes, activating the pump 11 until the increase in pressure in the accumulator 9 is sufficient for the breaker 27 to open once again.

When the hydraulic circuit is put out of operation, the leakage of fluid occurring between the piston 17 and the bore 7 allows the accumulator 9 to empty slowly into the reservoir 5.

In one embodiment, the breaker 29 was intended to light an electrical signal lamp when the pressure of the fluid in the accumulator was below 80 bars and therefore insufficient to operate reliably the hydraulic motor supplied in this way. The breaker 27 closed at a pressure decreasing below 160 bars and opened at a pressure exceeding 180 bars. This has therefore produced a pressure regulator allowing the hydraulic motor to receive permanently a fluid under a pressure of between 160 and 180 bars and making it possible to signal a failure of the hydraulic circuit. It will be appreciated that a careful choice of the rigidity of the spring 21 and of the position of the electrical breaker 27 makes it possible easily to modify the operating range of such a pressure regulator.

Preferably, a helical groove 18 is made on the periphery of the piston 17, in order to obtain a calibrated leakage, the flow of which will determine the time necessary for the accumulator 9 to empty of fluid completely. This groove also affords the advantage of ensuring a self-centering of the piston which, in fact, is not in contact with the carrier bore, but moves on a fluid film, thus reducing the hysteresis of the assembly as a whole.

An average person skilled in the art can make many modifications to such a regulator, without departing from the scope of the invention. Indeed, the groove 18 made on the piston could instead be made in the bore. The piston 17 and pusher 19 can be fixed to one another and even be produced integrally in one piece. Screws can be added to allow a pressure calibration of the pressure regulator by moving the breakers 27, 29 to a greater or lesser extent.

A filter can also be added at the entrance of the bore 7 connected to the accumulator 9, to prevent the clogging of the fluid leakage between the piston 17 and the bore 7.

What I claim is:

1. A leakage-type pressure regulator for a hydraulic circuit including at least one reservoir of fluid under low pressure, a pump and an accumulator of fluid under high pressure, said leakage-type pressure regulator comprising: a pusher projecting from a chamber connected to said reservoir; at least one sensor detecting the position of a magnetic core sliding under the effect of said pusher in the vicinity of said sensor, so as to control the functioning of said pump; a piston sliding non-sealingly in a bore communicating with said chamber and with an outlet of said accumulator, so as to establish a leakage of the hydraulic fluid between said accumulator and said reservoir, said piston having one end bearing on said pusher; and an elastic means opposing the effect of the pressure of said fluid in said accumulator on said piston, in such a way that the position of said core is a function of the pressure of said fluid in said accumulator.

2. The pressure regulator according to claim 1, wherein said elastic means is a helical spring arranged in said chamber and bearing on said pusher.

3. The pressure regulator according to claim 1, wherein said sensor is a magnetically controlled electrical breaker connected to an electrical supply circuit of said pump.

4. The pressure regulator according to claim 1, wherein said piston and said pusher are fixed to one another.

5. The pressure regulator according to claim 1 wherein at least one groove is made on the periphery of said piston.

6. The pressure regulator according to claim 5, wherein said groove assumes substantially the form of a helix.

7. The pressure regulator according to claim 1 wherein at least one groove is made in said bore.

8. The pressure regulator according to claim 7, wherein said groove assumes substantially the form of a helix.

* * * * *